United States Patent

Mauck

[15] 3,688,429
[45] Sept. 5, 1972

[54] FISHING LURE RETRIEVER
[72] Inventor: Robert J. Mauck, Pinconning, Mich. 48650
[22] Filed: Nov. 23, 1970
[21] Appl. No.: 91,824

[52] U.S. Cl. ................................................43/17.2
[51] Int. Cl. ..............................................A01k 97/00
[58] Field of Search ......................43/5, 17.2; 223/99

[56] References Cited

UNITED STATES PATENTS

| | | | |
|---|---|---|---|
| 2,948,077 | 8/1960 | Karpes | 43/17.2 |
| 2,676,430 | 4/1954 | Richard | 43/17.2 |
| 3,364,611 | 1/1968 | Downing | 43/17.2 |
| 2,950,558 | 8/1960 | Karpes | 43/17.2 |
| 1,851,370 | 3/1932 | Munger | 43/17.2 |
| 2,490,882 | 12/1949 | Pinkham et al. | 223/99 |
| 2,651,135 | 9/1953 | Greenleaf | 43/17.2 X |

Primary Examiner—Melvin D. Rein
Attorney—Harness, Dickey & Pierce

[57] ABSTRACT

The fish lure retriever is constructed from a flat washer having a slot extending from the outer edge to the inner aperture through which the line on a snagged lure can be passed. A retrieving line along with a plurality of chain sections are attached to the body so that when the body is slid down on the fish line to the lure the weight will produce a downward pull thereon or produce an outward prying force or a chain may engage the barbs of the hooks on the lure so that it can be released upon the pulling of the retrieving line.

7 Claims, 5 Drawing Figures

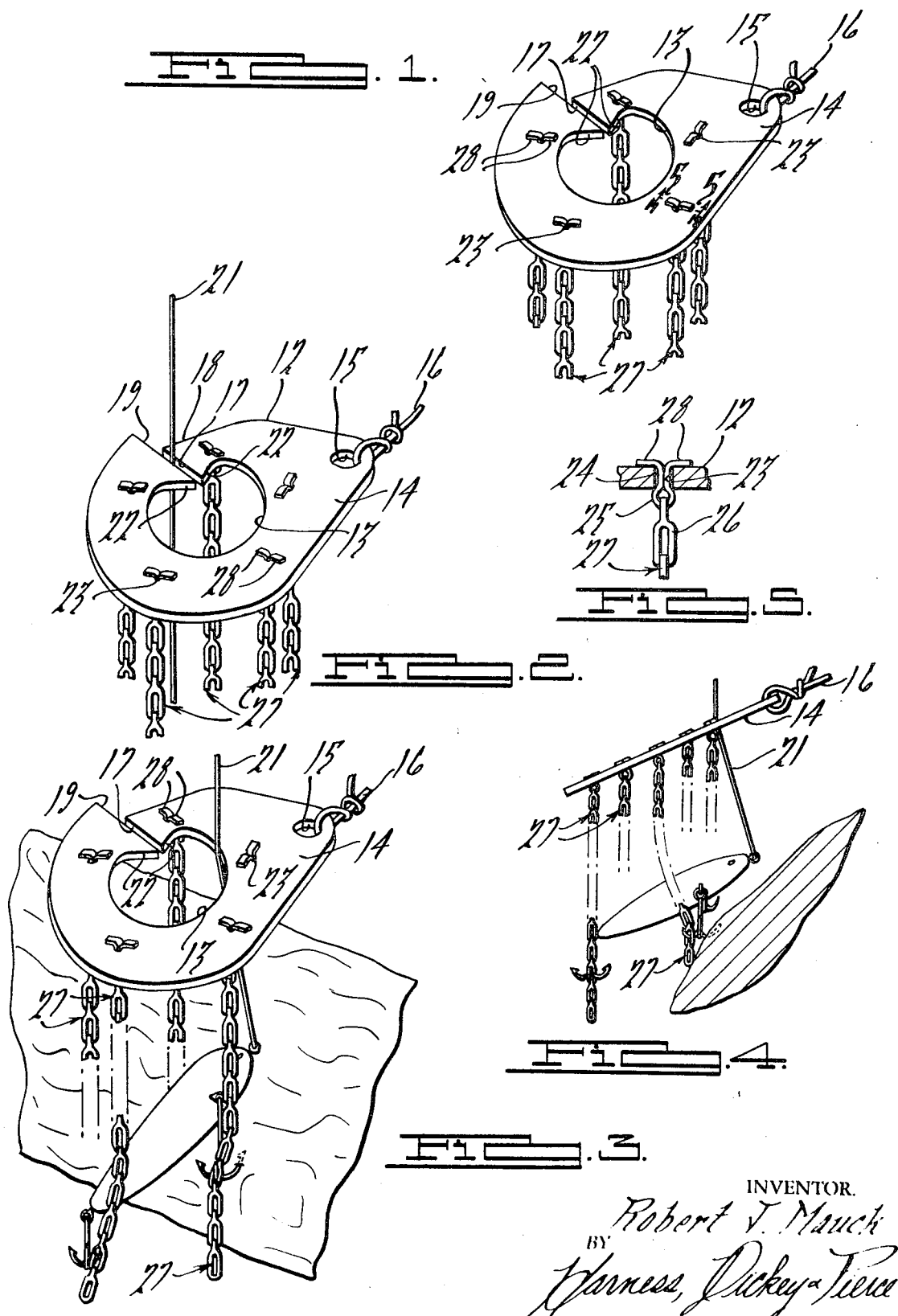

FISHING LURE RETRIEVER

BACKGROUND OF THE INVENTION

A search of the art disclosed the following pertinent U.S. Pat. Nos. 2,676,430; 2,793,457 and 3,012,355 which disclose the use of chain sections on a body having a retrieving line attached thereto over which the lure retriever of the present invention has features which are believed to be patentable.

SUMMARY OF THE INVENTION

The invention pertains to a fish lure retriever made from a flat washerlike plate having a central substantially circular aperture and an extension on one side containing an aperture for a strong retrieving line. A slot is provided between the outer edge of the body and the inner edge of the slot, one side of which is cut away to form a guide for a line which readily passes through the slot into the central aperture. The sides of the slot are extended into the aperture by inwardly projecting portions which prevent the line from passing outward through the slot. The body is provided with a plurality of apertures between the central aperture and the outer edge through which cotter pins extend having sections of chains supported in the eyes thereof from one side of the body.

The projecting ends of the cotter pins may be secured by clamping nuts and the like but are herein illustrated as having the legs bent apart and flattened against the face of the body on the side opposite to that from which the chain sections extend. The material employed is preferably rustproof and is of such weight that when the body is slid over the line it will engage the lure and provide a pry thereto or a downward pull which could release the snagged hook. The retriever can be pulled up and down by the retrieving line to cause one or more links of the chains to engage the snagged hook or other hooks of the lure so that it may be retrieved upon pulling on the retrieving line.

BRIEF DESCRIPTION OF THE DRAWING

FIG. 1 is a perspective view with a portion of the chain sections broken away of the fish lure retrieving device of the present invention;

FIG. 2 is a view of the structure illustrated in FIG. 1 with a fish lure line disposed in the slot by which it is advanced into the aperture at the center of the device;

FIG. 3 is a view of the structure illustrated in FIGS. 1 and 2 after the device has been lowered into a position to engage the lure, the chain sections of which are in position to snag the hooks thereof;

FIG. 4 is an edge view of the structure illustrated in FIG. 3, and

FIG. 5 is an enlarged sectional view of the structure illustrated in FIG. 1, taken on the line 5—5 thereof.

DESCRIPTION OF THE PREFERRED EMBODIMENTS

The fish lure retrieving device 11 has a flat body 12 of substantially washerlike form and of circular configuration having a central aperture 13 which is also of substantially circular form. The body 12 is extended at 14 and provided with an aperture 15 by which a retrieving line 16 is tied or otherwise secured, the line having substantial strength preferably of between 100 and 200 pounds test. A slot 17 extends from the outer edge of the body 12 to within the aperture 13, a portion of the body on one side of the slot being cut away at 18 to provide a shoulder 19. The fish line 21 will move against the shoulder and be directed into the aperture 13 when guided theretoward by the edge 18. The metal adjacent to the slot 17 is extended at 22 within the aperture 13 so as to prevent the line from reentering the slot and moving outwardly thereof. The line is parallel to the vertical slot and readily passes therethrough.

A plurality of spaced apertures 23 are provided through the body between the aperture 13 and outside edge through which cotter pins 24 extend after the eyes 25 thereof have the end link 26 of a length of chain 27 secured therein. Legs 28 of the cotter pins extend through the aperture 23 and are pried apart and flattened against the face of the body 12, as clearly illustrated in FIG. 5. Clamping nuts or other elements may be employed for locking the extended legs 28 to the plate although the flattening of the legs was found to be the cheapest and most positive way of retaining the cotter pins on the body.

The body and other parts of the retrieving device is made from a rustproof metal such as stainless steel, aluminum alloy, monel metal and the like which has the proper weight to apply a load to the lure when moved into engagement therewith. The body 12 is preferably stamped, forged or otherwise formed from a sheet of material with the slot 17 saw cut or otherwise provided through the body.

When a lure is snagged on an obstacle beneath the water, a pull on the lure line will sometimes set the hook more positively in the obstacle and may eventually break the line which usually will not withstand a heavy pull. In any event, when the lure is snagged, the retriever is passed over the fish line 21 as illustrated in FIG. 2. To apply the retriever to the fishing line 21, the body 12 preferably is held by the handle portion 14 with the slot 17 disposed at one side of the body facing the line and with the chains 27 dangling downwardly therefrom. This position of the retriever permits the fishing line 21 to be guided into the slot 17 by a simple wrist movement even under adverse conditions frequently encountered such as strong currents, wave action on the boat, gusty winds, jerky movement of the fishing line, etc., it is simply necessary to swing the body 12 generally in an arc so as to lay the shoulder 19 on the line 21. The shoulder then guides the line on into the slot 17 for entry into the central aperture 13. If necessary the line can be pulled slightly forward at this time to keep it taut and against the shoulder 19 and to overcome any unsteadiness on the part of the boat or the user. Manifestly, the drag on the lower end of the line due to the snagged lure and the tip of the fishing rod will hold the line 21 reasonably steady during this operation.

After the fishing line 21 has entered the central aperture 13, the body 12 is released and permitted to slide downwardly on the line by paying out the retrieving cord 16. As this action takes place, and indeed until the retriever is removed from the fishing line 21, the body 12 is prevented from inadvertently coming off the line by the latter coming into register with the inner end of the slot 17 by one or the other of the two protuberances 22. In general, the body 12 may turn and move about somewhat as it slides downwardly toward the lure but the protuberances 22 are quite effective in preventing it from turning or positioning itself so that the line 21 can enter the slot 17 and release the retriever.

If a barb of the lure is snagged on a solid object such as a log or a rock as shown in FIG. 3, the initial impact of the body 12 against the lure may be sufficient to dislodge the barb and to free the lure. On the other hand, if the barb is deeply embedded or badly tangled in weeds, for example, it usually cannot be disengaged and released simply by bumping the retriever against it. Under these conditions, it is necessary to jiggle the retriever up and down on the fishing line 21 immediately above the snagged lure so that the chains 27 dangling from the underside of the body 12 flop about and become entangled in one or perhaps several of the hooks on the lure. As soon as the person manipulating the retrieving cord 16 senses that the chains 27 have caught in the hooks he can exert a strong pull on the line 16 and tear the lure loose without danger of breaking the fishing line 21 or of losing the lure. Both the grappling chains 27 and the retrieving cord 16 preferably are sufficiently strong to straighten out the snagged hook, if necessary, but usually the lure will come free without damage. Sometimes, if the object on which the lure is snagged is not too heavy as in the case of weeds or a small branch, for example, both the lure and the object on which it is snagged may be brought to the surface where the lure can be physically disengaged or disentangled without damage to it or any of the hooks. It will be readily apparent, however, that even though a hook is bent out of shape in disengaging the lure from the snag, it can easily be bent back into shape and the barb sharpened for reuse.

It is a special feature of the retriever that many lures can be retrieved by the device of this invention even though all of the hooks should be so badly entangled or otherwise snagged that one or the other of the chains 27 cannot be engaged with the hooks. Due to the shape of the body 12 and particularly of the central aperture 13, jiggling of the body on the line 21 above the lure in the manner described above eventually causes the body to settle onto the tapered nose portion of the lure. This is true particularly of spoon shaped lures, for example. When this occurs, the lure is guided by one or the other of the two protuberances 22 in such a way that the body settles onto the lure with one edge of the latter engaged at the base of one protuberance and the opposite edge thereof wedged against the side of the aperture opposite the protuberance. When the body 12 settles onto the lure in this manner, a tug on the line 16 causes the body to cant or cock on the lure and thus bind against it in such a way that the body will not pull off the lure when the cord 16 is given a strong tug. Once the retriever body 12 has been attached to the lure in this manner, the line 16 can be pulled with enough force to break the lure loose from most snags.

I claim:

1. In a lure retriever, a stamped washerlike body having a slot from the outer edge to an inner central aperture, an aperture through the body adjacent to the outer edge for a retrieving line, said body having a plurality of apertures between the inner and outer edges, and means in each of said plurality of apertures for supporting chain sections from one face of the body, the supporting means for the chain sections being cotter pins having an eye which supports the end link of the chain sections from one side of the body, and means securing the extending legs of the cotter pin on the other side of the body.

2. In a lure retriever as recited in claim 1, wherein said body is substantially circular having an extended portion on one side containing said aperture for the retrieving line.

3. In a lure retriever as recited in claim 2, wherein the outer portion of the washerlike body at one side of the slot is deleted to form a guide edge for the line on the snagged lure which guides it against a shoulder and into the slot.

4. In a lure retriever as recited in claim 3, wherein said slot is disposed normal to the faces of the body to permit the line to readily pass therethrough.

5. In a lure retriever as recited in claim 4, wherein a central aperture is circular except for the portions each side of the slot which extends inwardly thereinto for preventing the line from reentering the slot.

6. In a lure retriever as recited in claim 1, wherein the securing means for the legs are the end portions which are flattened against the adjacent face of the body.

7. A retriever for snagged lures comprising a flat washer-like body having a central aperture stamped therein;

a plurality of chains
    attached to one face of said body and adapted to dangle downwardly therefrom, said body having a portion at one side thereof forming a handle, and said handle portion being provided with means
    for attaching a retrieving cord thereto, said body also provided with a through slot extending
    substantially at right angles to said handle portion from the periphery thereof to said central aperture, said body at the side of the slot remote from said handle portion extending radially outwardly beyond the portion of the body at the opposite side of slot and defining a shoulder
    adapted to engage and retain a fishing line and to guide the line into the slot for entry into said central aperture, and protuberances
    on said body within said aperture at opposite sides of said through slot serving the double function of retaining the fishing line within said central aperture and of guiding or positioning the body onto a snagged lure so that a tug on said retrieving cord cocks the body on the lure with a binding action, whereby to wedge the body and the lure together and to permit retrieval of the lure.

* * * * *